United States Patent [19]

Odagiri et al.

[11] Patent Number: 4,587,575
[45] Date of Patent: May 6, 1986

[54] METHOD AND APPARATUS FOR UTILIZING A DRIVE TAPE

[75] Inventors: Yoichi Odagiri; Tsuguo Sato, both of Yokohama, Japan

[73] Assignee: Sony Corporation, Tokyo, Japan

[21] Appl. No.: 574,536

[22] Filed: Jan. 27, 1984

[30] Foreign Application Priority Data

Jan. 31, 1983 [JP] Japan .................. 58-14334

[51] Int. Cl.⁴ .................. G11B 5/86; G11B 15/32
[52] U.S. Cl. .................. 360/15; 360/16; 360/74.1; 242/181; 369/84
[58] Field of Search .................. 360/15, 16, 91, 92, 360/74.5, 74.1; 369/84; 242/180, 181; 226/143

[56] References Cited

U.S. PATENT DOCUMENTS

| | | | |
|---|---|---|---|
| 3,812,532 | 5/1974 | Crosser et al. | 360/72.3 |
| 4,185,306 | 1/1980 | Dudley | 360/71 |

FOREIGN PATENT DOCUMENTS 58-161141 9/1983 Japan .................. 360/16

Primary Examiner—Raymond F. Cardillo
Assistant Examiner—Alyssa H. Bowler
Attorney, Agent, or Firm—Lewis H. Eslinger; Alvin Sinderbrand

[57] ABSTRACT

The present invention involves a method and apparatus to prolong the useful life of a drive tape used in a magnetic contact printer to advance master and copy tapes past a transcribing head to transcribe the signals from the master tape onto the copy tape. The present invention provides a method for using the entire length of the drive tape even though individual segments on different master tapes may be shorter than the length of the drive tape. In the method of the present invention the drive tape is rewound after each transcription only part of the way to the beginning of that transcription. The next transcription will then require the use of a part of the drive tape not used in the previous transcription. The apparatus of the present invention uses a digital logic circuit to carry out that method. The apparatus comprises a counter that senses the length of advance of the drive tape for each transcription and detectors that provide signals to terminate the rewindings of the drive tape at the proper points.

20 Claims, 11 Drawing Figures

METHOD AND APPARATUS FOR UTILIZING A DRIVE TAPE

BACKGROUND OF THE INVENTION

1. Field of the Invention

The present invention relates to the use of a drive tape to advance two tapes in mutual contact with the drive tape and, more particularly, to a method and apparatus for prolonging the useful life of such a drive tape.

2. Description of the Prior Art

Magnetic contact printers are used to transcribe signals from a master tape onto a copy tape. Both the master and copy tapes are driven in unison past a transcribing head which causes the signals recorded on the master tape to be duplicated on the copy tape. Typically, the master and copy tapes are advanced by a drive tape which is pressed together with the master and copy tapes.

The drive tape is made long enough to accommodate the longest master and copy tapes expected to be used. However, the length of the recorded portion on the master tape often is less than the length of the drive tape. In conventional printers the drive tape is rewound to its starting point each time a transcription operation is completed. Consequently, the beginning part of the drive tape wears out faster than the rest.

The physical condition of the drive tape deteriorates as it repeatedly rubs agains other parts of the printer. As the physical condition of the drive tape deteriorates, so does the quality of the transcription, until it becomes so poor that the drive tape must be replaced. In most cases the drive tape past the beginning portion is still in good condition when the beginning portion has already worn out. Therefore, the cost of drive tapes for such printers is unnecessarily high because they frequently have to be replaced before they are worn out over their entire length.

SUMMARY OF THE INVENTION

It is an object of the present invention to overcome the disadvantages of the prior art.

It is another object of the invention to provide a method for prolonging the life of a drive tape.

It is a further object of the invention to provide apparatus for prolonging the life of a drive tape used to drive first and second tapes in mutual contact with the drive tape.

In accordance with an aspect of the present invention a drive tape is used to drive first and second tapes pressed together with the drive tape. The drive tape is advanced from a first starting point to advance the first and second tapes. By detecting the length of advancement of the drive tape, the drive tape can be rewound to a second starting point in advance of the first starting point.

Other objects, features and advantages of the present invention will become apparent when considering the drawings and the following detailed description of preferred embodiments of the invention.

DETAILED DESCRIPTION OF PREFERRED EMBODIMENTS

Figure 1:
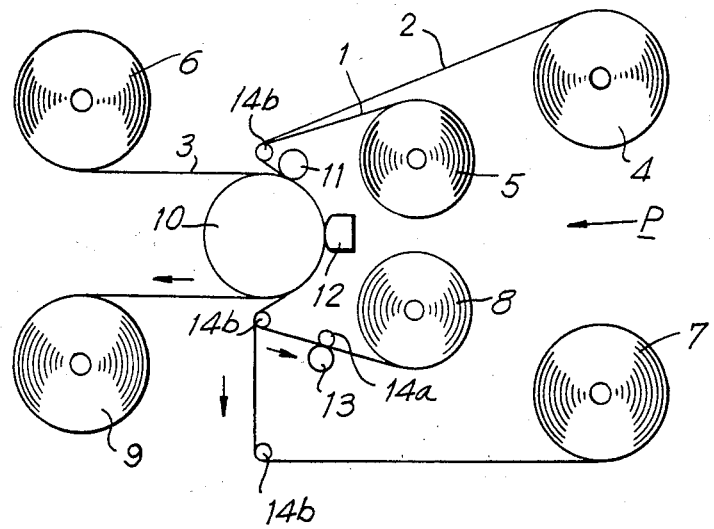
FIG. 1 is a schematic drawing of a prior art magnetic contact printer.

The present invention will be best understood by referring to the structure and operation of the prior art magnetic contact printer P shown in FIG. 1.

A drive tape 1 is disposed on one side of a master tape 2, on the other side of which is disposed a copy tape 3. The master tape 2 is supplied from a supply reel 4 and the drive tape 1 and copy tape 3 are supplied from supply reels 5 and 6, respectively. The tapes 1, 2 and 3, also have respective take-up reels 7, 8 and 9, onto which the tapes are wound as they advance. The three tapes, pressed together with the master tape 2 between the drive tape 1 and the copy tape 3, pass in unison over a back-up roller 10. A press roller 11 presses the drive, master and copy tapes together so that advancement of the drive tape 1 will also advance the master tape 2 and copy tape 3. As the tapes pass a transcription head 12, recorded signals from the master tape 2 are transcribed onto the copy tape 3.

The drive tape 1 passes between a motor-driven capstan 13 and a pinch roller 14a, which presses the drive tape 1 against the capstan 13 to advance the drive tape 1 as the capstan 13 rotates. The tapes 1, 2 and 3, pass over various guide rollers 14b to provide the tape paths shown in FIG. 1.

The drive tape 1 has a length that will accommodate the longest possible recorded segment on the master tape 2. For example, if the master tapes to be used have a maximum recording length corresponding to three hours at a given playing speed, the drive tape 1 typically will be made long enough to accommodate three-and-one-half hours.

To illustrate how the prior art printer P fails to utilize fully the drive tape 1, consider how the printer P operates if the master tape 2 has a segment that is to be transcribed which represents only one-half hour of playing time. With the printer P, each time a one-half hour segment is transcribed, the drive tape 1 is rewound to the beginning. Thus, a fairly small portion of the drive tape 1 is used repeatedly.

The drive tape 1 is subject to physical deterioration from running over the various rollers and in and out of the supply and take-up reels 5 and 8. In prior art printers, the small portion at the beginning of the drive tape 1 will wear out long before the rest of it. The drive tape 1 thus will have to be replaced without having been fully utilized.

Figure 2:
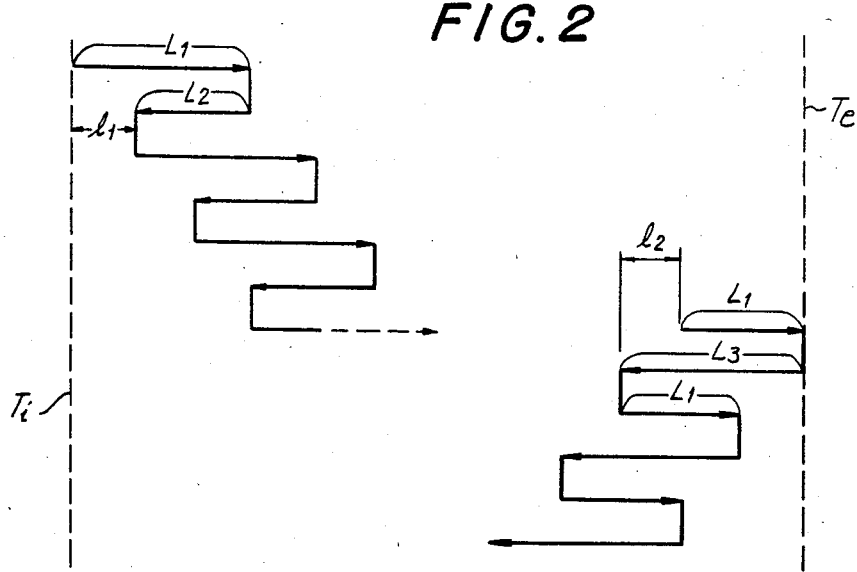
FIG. 2 illustrates a method in accordance with the present invention for prolonging the life of the drive tape used with the printer shown in FIG. 1.

FIG. 2 illustrates how the method in accordance with the present invention overcomes that problem. The dotted line $T_i$ represents the beginning of a usable portion of the drive tape 1 and the dotted line $T_e$ represents the end of the usable portion of the drive tape 1. $L_1$ represents the amount of the drive tape 1 used to drive the master and copy tapes for any particular transcription. Assume that the starting point for the first transcription begins at $T_i$, so that $T_i$ is a first starting point. When the first transcription is complete, the drive tape 1 is stopped and then is rewound a distance $L_2$, which is less than $L_1$ by a length $l_1$. Thus, the drive tape 1 is rewound to a second starting point in advance of the first starting point.

The second transcription begins at the second starting point and continues until another length $L_1$ of the drive tape 1 is used. Because the second transcription began at the second starting point, part of the second transcription uses a portion of the drive tape 1 that was not used in the first transcription. The advancement of the drive tape 1 a length $L_1$ for each transcription and the rewinding of the drive tape 1 a length $L_2$ shorter than $L_1$ after each transcription is repeated until the end of the drive tape $T_e$ is reached.

Prior to starting the next transcription after the end of the tape has been reached, the drive tape is rewound a length $L_3$ that is longer than the length of the previous transcription by a length $l_2$. Then, the next transcription begins and uses another length $L_1$ of the drive tape 1. After completion of that transcription, the tape is again rewound to a point beyond where that transcription began. Thus, the drive tape 1 is eventually rewound to its beginning $T_i$. In that way, the entire usable portion of the drive tape 1 is utilized even though each segment to be transcribed from the master tapes is less than the length of the drive tape 1.

Using that method, the useful life of the drive tape can be significantly prolonged. For example, if the segments to be transcribed are each 30 minutes long and the driving tape has a length corresponding to 3.5 hours, it is possible to provide the drive tape 1 with a useful life six times longer than it would have if it were completely rewound after each transcription as in prior art printers.

It is understood that $l_1$ should be greater than zero, but no greater than $L_1$. Of course, if $l_1 = L_1$, then the drive tape 1 is not rewound at all after each transcription. In addition, it is contemplated that $l_2$ be chosen so that the drive tape 1 is always rewound after a particular transcription to a point beyond the beginning of that transcription.

For purposes of this description, the portion of the method which gradually uses the drive tape 1 from its beginning $T_i$ to its end $T_e$ will be referred to as the "forward" portion of one operating cycle. Thus, a rewinding step in which the drive tape is rewound a distance $L_2$ will be called a "forward rewind". A transcription in this portion of the cycle be called a "forward transcription". The portion of the cycle which gradually uses the drive tape 1 from its end $T_e$ to its beginning $T_i$ will be called the "reverse portion". Thus, "a reverse rewind" uses the length $L_3$ of the drive tape 1. A transcription in that direction will be called a "reverse transcription".

Although FIG. 2 shows identical transcription lengths throughout the method in accordance with the present invention, it is contemplated that a variety of different transcription lengths can be accommodated during each complete operating cycle. In practice, the lengths $l_1$ and $l_2$ have predetermined, constant values.

Figure 3:
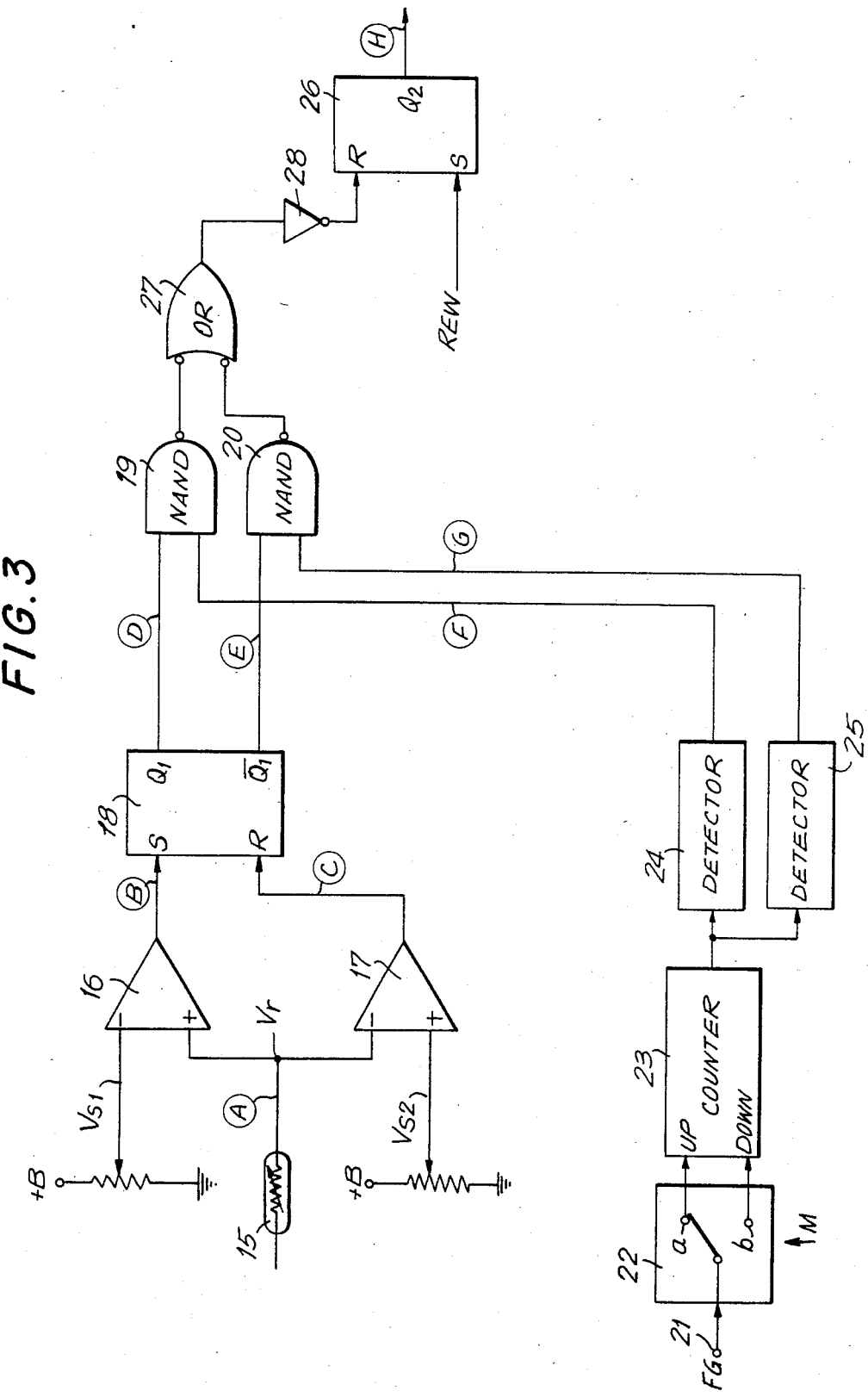
FIG. 3 is a schematic drawing of apparatus in accordance with the present invention for carrying out the method depicted in FIG. 2.

FIG. 3 shows apparatus for carrying out the method of the present invention.

A diameter sensor 15 senses the length of advance of the drive tape 1 from the beginning $T_i$ thereof. FIG. 3 shows the diameter sensor 15 as a variable potentiometer that produces a voltage $V_r$ that changes in accordance with the length of advancement of the drive tape 1. The variable potentiometer can be used with a conventional roller (not shown) in contact with the tape wound around the supply reel 5 so that the roller presses against the tape and squeezes the air from between successive layers of tape on the reel. The variable potentiometer varies the voltage $V_r$ in accordance with the angle of the arm. Consequently, the level of the voltage $V_r$ corresponds to the diameter of tape contained on the supply reels and indicates the length of advancement of the drive tape 1.

The voltage $V_r$ is supplied to two comparators 16 and 17. The first comparator 16 has an inverting input supplied with a first reference voltage $V_{S1}$, set in a conventional manner by dividing a supply voltage B. The voltage $V_{S1}$ represents the value of $V_r$ when a particular diameter of the tape wound in the supply reel 5 is reached. For reasons which will be apparent as this description proceeds, that maximum diameter is reached slightly before all of the drive tape 1 is on the supply reels. The voltage $V_r$ is supplied to the non-inverting input of the first comparator 16.

The second comparator 17 has a non-inverting input supplied with a second reference voltage $V_{S2}$, set in a conventional manner by dividing a supply voltage B. The voltage $V_{S2}$ is chosen so that it represents the length of advancement of the drive tape 1 when there is a length of drive tape remaining on the supply reel 5 a predetermined distance before the end $T_e$ of drive tape 1 is reached.

The first comparator 16 provides a digital "1" output when $V_r$ exceeds $V_{S1}$ and the second comparator 17 provides a digital "1" output when $V_r$ drops below $V_{S2}$. Otherwise, the level of the outputs of the comparators 16 and 17 have a level corresponding to a digital "0". The outputs of the comparators thus comprise beginning-of-tape and end-of-tape sensing signals.

A master flip-flop 18 has a set terminal S and reset terminal R, and two output terminals $Q_1$, and $\overline{Q}_1$. In the conventional manner, the master flip-flop 18 provides a digital "1" signal at $Q_1$, and a digital "0" signal at $\overline{Q}_1$, upon receiving a digital "1" signal at the set terminal S. The master flip-flop 18 remains at that state, supplying those outputs, until a digital "1" signal is received at the reset terminal R, at which time the signal at $Q_1$ becomes "0" and a "1" signal appears at $\overline{Q}_1$. When a "1" signal is again received at the set terminal S, the states of the signals at the terminals $Q_1$ and $\overline{Q}_1$ again flip flop to provide $Q_1 = 1$ and $\overline{Q}_1 = 0$.

The signals from the output terminals $Q_1$ and $\overline{Q}_1$ are each supplied to one input terminal of NAND circuits 19 and 20, respectively. Each NAND circuit 19 and 20 is conventional in that it supplies a digital "1" signal at its output unless a digital "1" signal appears at both inputs; if a digital "1" appears at both inputs, its output becomes "0".

The apparatus shown in FIG. 3 also includes a frequency generator FG which supplies pulses to an input terminal 21. The pulses are generated by the rotation of a motor (not shown) which drives the take-up reel 8 for the drive tape 1. The signal from the terminal 21 is supplied to the movable terminal of a switch 22. The movable terminal of the switch 22 can be moved between fixed terminals 22a and 22b. The switch 22 provides a circuit path through the terminal 22a when the drive tape 1 is moving forward or advancing, which is the direction in which transcriptions take place. A signal M, which lasts the duration of a rewind operation, provides a circuit path through the terminal 22b.

An up-down counter 23 receives the output from the switch 22. Completion of a circuit path through terminal 22a of the switch 22 causes the count in the counter 23 to increase each time it receives a pulse from the frequency generator FG; completion of a circuit path through terminal 22b causes the count in the counter to decrease in the same manner. Thus, as the drive tape 1 advances, the count in the counter 23 increases. As the drive tape 1 rewinds, the count in the counter 23 decreases.

The count in the counter 23 is stored in a first detector 24 and second detector 25. The first detector 24 provides digital "1" pulse when the count in the counter 23 corresponds to a length of drive tape 1 equal to $l_1$. The second detector 25 provides a digital "1" pulse when the count in the counter 23 corresponds to a length of drive tape 1 equal to $l_2$ and is negative. The detectors' outputs are otherwise "0". The outputs of the detectors 24 and 25 are supplied to the other inputs of the NAND circuits 19 and 20, respectively.

The outputs of the NAND circuits 19 and 20 are used to generate a reset pulse for a rewind flip-flop 26. The rewind flip-flop 26 has a reset terminal R that accepts a reset pulse which is generated from the output of the NAND circuits 19 and 20. The rewind flip-flop 26 also includes a set terminal S that accepts a rewind pulse REW generated by the initiation of a rewind operation. The rewind flip-flop 26 provides a digital "1" output at the terminal $Q_2$ in accordance with the signal last received at terminals R and S. The output at $Q_2$ is a digital "0" when the R terminal receives a digital "0" signal. $Q_2$ remains at "0" until a digital "1" is received at the S terminal, at which time $Q_2$ changes to a digital "1". It remains a digital "1" until a digital "0" is received at the R terminal, at which time it flip flops to a digital "0" again.

An OR circuit 27 and an inverter 28 generate the reset pulse from the outputs of the NAND circuits 19 and 20. The OR circuit 27 operates in the conventional manner. It provides a digital "1" output unless both inputs are a digital "0"; if both inputs are a digital "0", it provides a digital "1" output. The outputs of the NAND circuits 19 and 20 are inverted before introduction to the OR circuit 27. The inverter 28 accepts a digital "0" or "1" signal and provides as an output a digital "1" or "0" signal, respectively.

The operation of the apparatus shown in FIG. 3 can be understood by reference to FIGS. 4A-4H. The letter associated with each of FIGS. 4A-4H indicates the signal where that particular letter appears in the apparatus shown in FIG. 3. Assume that the drive tape 1 has been rewound to its beginning and a cycle of operation is to be started.

Figure 4A:
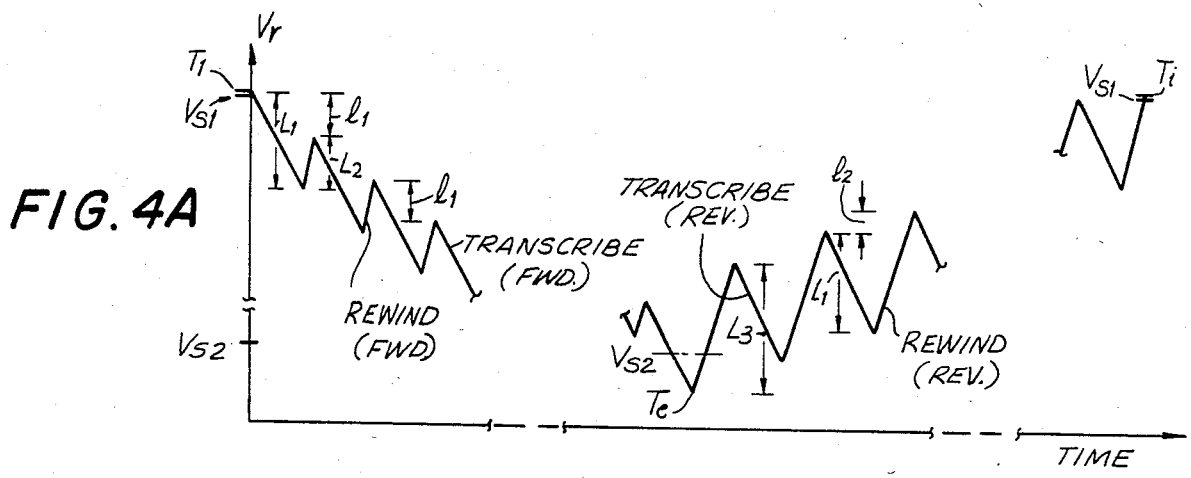
FIGS. 4A-4H show the signals produced at various points by the apparatus shown in FIG. 3.
Figure 4B:
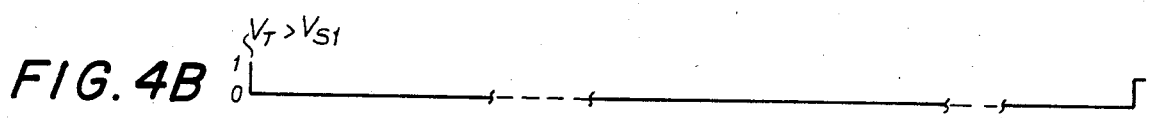
Figure 4C:
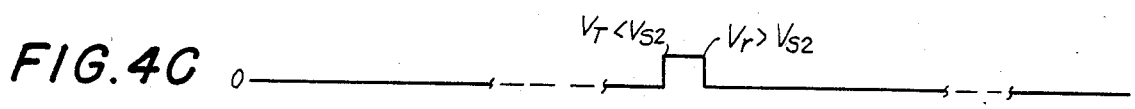
Figure 4D:
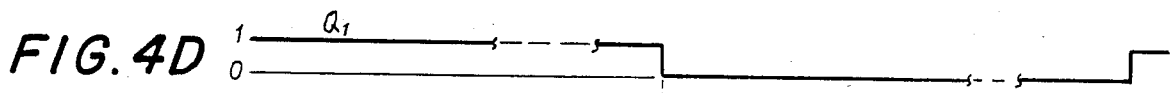
Figure 4E:
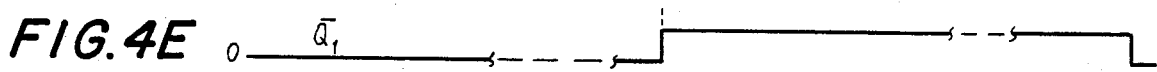

As shown in FIG. 4A, the voltage $V_r$ (which corresponds to the length of advancement of the drive tape 1) at the beginning $T_i$ of the drive tape 1 is at least as large as $V_{S1}$. The switch 22 provides a circuit path from terminal 21 to the up-counting terminal of the counter 23, which has been set to zero. The rewind signal H is a digital "0". The beginning-of-tape signal B causes the master flip-flop 18 to be set as shown in FIGS. 4D and 4E. The first transcription is begun and, as it proceeds, the counts supplied to the detector 24 and detector 25 increases because the pulses from the frequency generator FG applied to the terminal 21 causes the counter 23 to count up. At the outset of the first transcription, the master flip-flop 18 provides the forward master signal D from the terminal $Q_1=1$ and the reverse master signal E from the terminal $\overline{Q}_1=0$. When the output of the comparator 16 drops below $V_{S1}$ shortly after the initiation of the first transcription, the beginning-of-tape signal B terminates, but the master flip-flop 18 remains in the same state and will until $V_r$ becomes less than $V_{S2}$.

When the transcription is complete, the drive tape 1 is stopped and a rewind pulse REW is provided to the S terminal of the rewind flip-flop 26. The rewinding signal H becomes "1" and the first "forward rewind" begins. The REW pulse also triggers the switching pulse M, which moves the movable contact of the switch 22 to provide a circuit path which will cause the counter 23 to count down as rewinding proceeds. The switching pulse M is maintained for as long as the signal H is "1" by the conventional technique known as "latching", and thus the count in the counter decreases throughout each rewinding step. It of course would be possible to control the switch 22 using the signal H directly, as those skilled in the art will recognize.

Figure 4F:

As the counter 23 counts down, its count is supplied to the first detector 24 and the second detector 25. When the count in the counter 23 corresponds to the length of tape chosen for forward-difference length $l_1$, the detector 24 provides the forward-differencea signal F. For reasons which will be understood when the second detector 25 is discussed in more detail during the description of the reverse portion of the cycle of operation, the second detector 25 does not provide pulses during the forward portion of the operation. (As FIG. 4F shows, the first detector 24 also provides the signal F as a "1" during the transcription. But since the rewinding signal H is already "0", the signal F has no effect when thus provided.)

When the first detector 24 provides the signal F as a pulse, the output of the NAND circuit 19 becomes "0", the output of the OR circuit 27 becomes "1", the output of the inverter 28 becomes "0", the output H of the rewind flip-flop 26 becomes "0" and rewinding is terminated. At that time, the count in the counter 23 is again set to zero. The switch 22 is again set to provide a circuit path to increase the count in the counter 23 when the next transcription begins.

The next forward transcriptions and rewindings proceed as just described, until the drive tape 1 is advanced during a transcription far enough to cause the voltage $V_r$ to drop below $V_{S2}$. The output of the comparator 17 becomes "1" and this comprises an end-of-tape signal C. The master flip-flop 18 then changes so that $Q_1=0$ and $\overline{Q}_1=1$. The count in the counter 23 stands at $L_1$ when that transcription is complete, and the point on the drive tape 1 reached when that transcription is over defines the tape end $T_e$, as shown in FIG. 4A. Of course, $V_{S2}$ is set so that $T_e$ is in advance of the actual physical end of the drive tape 1 to ensure that the entire forward transcription at the end of the forward portion of the cycle can be completed.

When the REW pulse is initiated (by a machine operator, for example) the rewinding signal H becomes "1" and the first reverse rewind begins. As rewinding proceeds, the count in the counter 23 decreases and the voltage $V_r$ becomes greater than $V_{S2}$, although that does not affect the rewinding operation because the master flip-flop 18 continues in the state wherein the forward master signal D= "0" and the reverse master signal E= "1".

At another point, the first detector 24 will provide a pulse. However, because the master signal D remains "0", the output of the NAND circuit 19 remains "1". In fact, the output of the NAND circuit 19 remains "1" throughout the entire reverse part of the cycle.

Figure 4G:
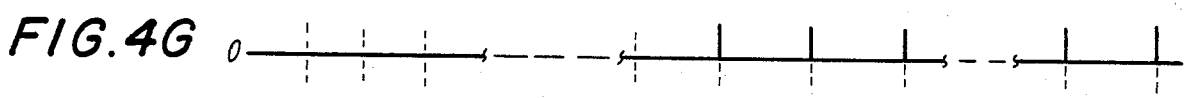
Figure 4H:
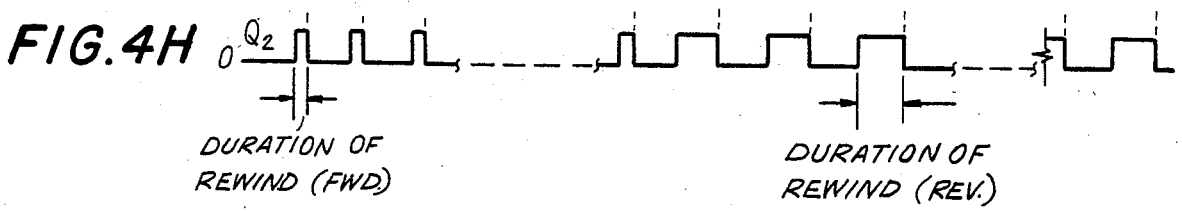

However, when the counter 23 has counted down a number corresponding to a length of drive tape 1 equal to $L_3$, the second detector 25 provides a reverse-difference signal G as a "1" pulse, as shown in FIG. 4G. (The detector 25 does not provide pulses during the forward rewinding operations since $L_3$ is never reached.) In any case, the output of the NAND circuit 20 then becomes "0", the output of the OR circuit 27 becomes "1", the output of the inverter 28 becomes "0" and the rewinding signal H becomes "0". The rewind operation then terminates.

The count in the counter 23 is again set to zero and the switch 22 is set to count up when the next reverse transcription begins. (As FIG. 4F shows, the first detector 24 continues to provide a pulse during each reverse rewinding step, but because the forward master signal D ="0", it blocks any effect of the signal F during the reverse portion of the cycle.) The drive tape 1 is thus gradually rewound until the last reverse rewinding operation rewinds the tape to the beginning $T_j$. Since $V_r$ again exceeds $V_{S1}$ at that point, the master flip-flop 18 is again set as discussed above and another cycle of operation can be started. It will be appreciated that $V_{S1}$ is chosen to ensure that the actual beginning of the drive tape is not reached until $V_r$ exceeds $V_{S1}$.

Thus, the apparatus in accordance with the present invention shown in FIG. 3 will prolong the useful life of drive tapes used in magnetic contact printers by utilizing substantially the entire tape even though each segment to be transcribed is shorter than the length of the drive tape.

Although specific embodiments of the invention have been described in detail with reference to the accompanying drawings, it is to be understood that the invention is not limited to those embodiments, and that various changes and modification other than those specifically pointed out can be made by those skilled in the art without departing from the scope or spirit of the invention as defined in the following claims.

What is claimed is:

1. A method of driving a first master magnetic recording tape having signals recorded thereon and a second copy magnetic recording tape using a drive tape pressed together with said first and second tapes, the method comprising:
   advancing said drive tape from a first starting point to advance said first and second tapes; and
   rewinding said drive tape to a second starting point on said drive tape located in advance of said first starting point.

2. A method as in claim 1; wherein said drive tape and said first master magnetic recording and said second copy magnetic recording tapes are held together to advance said first and second tapes in unison when said drive tape is advanced and said first and second tapes are out of contact with said drive tape during rewinding.

3. A method as in claim 2 further comprising the steps of:
   initially advancing said master tape an said copy tape in unison from a first forward starting point for a transcription distance less than the length of said drive tape;
   rewinding said drive tape to a second forward starting point in advance of said first forward starting point; and
   subsequently advancing another pair of said first master tape and said second copy tape from said second forward starting point.

4. A method as in claim 3; wherein said rewinding and subsequent advancing steps are repeated until said drive tape has been advanced to a terminal point thereof.

5. A method as in claim 4; wherein each of said second and subsequent forward starting points is located the same forward-difference length of tape in advance of the immediately preceding forward starting point.

6. A method as in claim 5; wherein said forward difference length of tape is greater than zero and less than the shortest forward transcription distance.

7. A method as in claim 4; further comprising the steps of:
   initially rewinding said drive tape from said terminal point a first rewind distance to a first rewind starting point beyond the preceding forward starting point;
   advancing said drive tape from said first rewind starting point a transcription distance; and
   subsequently rewinding said drive tape to a second rewind starting point beyond said first rewind starting point.

8. A method as in claim 7; wherein said advancing and subsequent rewinding steps are repeated until said drive tape has been rewound substantially to said first forward starting point.

9. A method as in claim 8; wherein said first and subsequent rewind starting points are located the same reverse-difference length of tape beyond the immediately preceding starting point.

10. Apparatus for advancing first and second magnetic recording tapes from a first starting point using a drive tape pressed together with the first and second tapes, the apparatus comprising:
    driving means for advancing and rewinding said drive tape;
    detecting means for detecting the length of advancement of said drive tape; and
    control means operative in response to said detecting means for controlling said driving means to rewind said drive tape to a second starting point in advance of said first starting point.

11. Apparatus as in claim 10; wherein said first and second tapes comprise master and copy tapes, respectively, and said drive tape and said master and copy tapes are held together to advance said master and copy tapes in unison a predetermined transcription distance for the transcription onto said copy tape of signals recorded on said master tape, said transcription distance being less than the length of said drive tape.

12. Apparatus as in claim 11; wherein a first forward starting point for said drive tape is proximate to the beginning of said drive tape and said detecting means includes a counter for adding and subtracting pulses provided by said driving means during the advancement and rewinding of said drive tape, respectively, and detector means for providing a difference signal for terminating the rewinding of said drive tape in response to the count in said counter when said drive tape has been rewound to a second forward starting point in advance of the first forward starting point a length of drive tape corresponding to the count providing said difference signal.

13. Apparatus as in claim 12; wherein said control means comprises sensing means for sensing a point on the drive tape proximate to the end thereof and providing an end-of-tape sensing signal when said respective point is reached and logic circuit means for accepting said difference signal and in response thereto terminating the rewinding of said drive tape at a number of subsequent forward starting points, each of which is located in advance of the preceding forward starting point a predetermined forward-difference length of tape, until said end-of-tape sensing signal is received by said logic circuit means.

14. Apparatus as in claim 13; wherein said drive tape has a first rewind starting point at the end of a final forward transcription and said detector means provides a reverse-difference signal for terminating each subsequent rewinding of said drive tape when said drive tape has been rewound to subsequent rewind starting points, each of which is beyond the preceding starting point by a predetermined reverse-difference length of tape, until said drive tape is rewound substantially to said first-starting point.

15. Apparatus as in claim 14; wherein said counter is reset to zero at the beginning of each transcription and said detection means includes a first detector for accepting the count in said counter and providing said forward difference detection signal when said count corresponds to said forward-difference length of drive tape and a second detector for accepting the count in said counter and providing said reverse-difference detection signal when said count corresponds to said reverse-difference length of drive tape.

16. Apparatus as in claim 15; wherein:
said sensing means includes voltage generating means for providing an analog signal the level of which corresponds to the length of advancement of the drive tape from the beginning thereof, first comparator means for providing a beginning-of-tape signal when the level of said analog signal exceeds a first reference level representing a point on the drive tape a predetermined distance from the beginning thereof and second comparator means for providing said end-of-tape signal when the level of said analog signal is below a second reference level representing a point on the drive tape a predetermined distance from the end thereof; and
said logic circuit means includes a master flip-flop circuit for accepting said beginning- and end-of-tape signals and providing a digital "1" first master signal and a digital "0" second master signal on receipt of said beginning-of-tape signal and a digital "0" first master signal and digital "1" second master signal on receipt of said end-of-tape signal, a first NAND circuit for accepting said forward-difference detection signal and said first master signal, a second NAND circuit for accepting said reverse-difference detection signal and said second master signal, an OR circuit for accepting the outputs of said NAND circuits after inversion thereof and a rewind terminating means for accepting the output of said OR circuit and terminating a rewind operation when the output of said OR circuit is a digital "1"

17. Apparatus as in claim 16; wherein said rewind terminating means includes an inverter means for accepting the output of said OR circuit and a rewind flip-flop circuit for providing a rewinding signal in response to the output of said inverter and an externally supplied rewind pulse, wherein said rewinding signal initiates rewinding of the drive tape in response to said rewind pulse and terminates rewinding of the drive tape when the output of said inverter is zero.

18. Apparatus as in claim 17; wherein said detecting means includes switch means for adding said counting pulses to the count in said counter during advancement of the drive tape and subtracting said counting pulses from the count in said counter during rewinding of said drive tape.

19. A magnetic contact printer for transcribing onto a copy tape the signals recorded on a master tape by pressing said master and copy tapes together with a drive tape and advancing said tapes past a transcribing head by advancing the drive tape; the printer comprising:
driving means for advancing the drive tape from a first starting point for first and subsequent transcriptions and for rewinding the drive tape between transcriptions;
detecting means for detecting the length of advancement of the drive tape; and
control means operative in response to said detecting means for controlling said driving means to rewind the drive tape to a subsequent starting point for each subsequent transcription to a point in advance of the starting point for the immediately preceding transcription.

20. A printer as in claim 19 wherein said control means is operative to advance said drive tape from said first starting point to a number of said subsequent starting points, each being a forward-difference length in advance of the immediately preceding starting point, until a terminal point of said drive tape is reached, and then to rewind said drive tape to a number of said subsequent starting points, each being a reverse-difference length beyond the immediately preceding starting point, until a point on said drive tape proximate to said first starting point is reached.

* * * * *